(12) United States Patent
Li et al.

(10) Patent No.: US 12,017,145 B2
(45) Date of Patent: Jun. 25, 2024

(54) METHOD AND SYSTEM OF AUTOMATIC ANIMATION GENERATION

(71) Applicant: SHANGHAI BILIBILI TECHNOLOGY CO., LTD., Shanghai (CN)

(72) Inventors: Jie Li, Shanghai (CN); Biao Yan, Shanghai (CN); Simin Chen, Shanghai (CN)

(73) Assignee: SHANGHAI BILIBILI TECHNOLOGY CO, LTD., Shanghai (CN)

( * ) Notice: Subject to any disclaimer, the term of this patent is extended or adjusted under 35 U.S.C. 154(b) by 369 days.

(21) Appl. No.: 17/416,837

(22) PCT Filed: Dec. 16, 2019

(86) PCT No.: PCT/CN2019/125527
§ 371 (c)(1),
(2) Date: Jun. 21, 2021

(87) PCT Pub. No.: WO2020/125567
PCT Pub. Date: Jun. 25, 2020

(65) Prior Publication Data
US 2022/0080318 A1    Mar. 17, 2022

(30) Foreign Application Priority Data
Dec. 21, 2018   (CN) .......................... 201811569106.8

(51) Int. Cl.
A63F 13/60    (2014.01)
A63F 13/52    (2014.01)
(Continued)

(52) U.S. Cl.
CPC .............. *A63F 13/60* (2014.09); *A63F 13/52* (2014.09); *A63F 13/56* (2014.09); *G06T 13/20* (2013.01); *G06T 13/40* (2013.01)

(58) Field of Classification Search
CPC ........... G06T 13/20; G06T 13/40; A63F 13/60
See application file for complete search history.

(56) References Cited

U.S. PATENT DOCUMENTS 9,223,192 B1 * 12/2015 Linnell ................ G03B 21/608
2020/0126283 A1 * 4/2020 van Vuuren ............ G06T 17/20

FOREIGN PATENT DOCUMENTS

CN    102880283 A    1/2013
CN    106815880 A    6/2017
(Continued)

OTHER PUBLICATIONS

International Patent Application No. PCT/CN2019/125527; Int'l Search Report; dated Mar. 19, 2020; 2 pages.
(Continued)

*Primary Examiner* — Matthew Salvucci
(74) *Attorney, Agent, or Firm* — BakerHostetler

(57) ABSTRACT

A method and a system of automatically generating animations imports Json data exported from a Spine tool into a Unity3d tool, parses the Json data into an animation data format by the Unity3d tool, obtains key frame information from the animation data format and stores the key frame information as an animation file of the Unity3d tool, and runs the animation file to play an animation. The present invention does not need to remake the Spine key frame in the Unity3d tool, and the key frame can be automatically generated. The animation key frame effects of the Spine tool can be reproduced, such as displacement, zooming, rotation, and color change, and the animation made by the artist in the Spine tool can be accurately restored, which reduces repeti- (Continued)

tive work and greatly improves the efficiency of game development.

17 Claims, 3 Drawing Sheets

(51) Int. Cl.
  *A63F 13/56* (2014.01)
  *G06T 13/20* (2011.01)
  *G06T 13/40* (2011.01)

(56) References Cited

FOREIGN PATENT DOCUMENTS

| CN | 108010112 A | | 5/2018 | |
|---|---|---|---|---|
| CN | 108449409 A | * | 8/2018 | ......... G06F 16/9535 |
| CN | 108897567 A | | 11/2018 | |
| CN | 109658484 A | | 4/2019 | |

OTHER PUBLICATIONS https:/blog.csdn.net/wlqchengzhangji/article/details/47977595; Spine2D animation research and learning referenced in Unity3D (1); Microsoft Ignite China; CSDN; © 2020; accessed Mar. 18, 2021; 3 pages (Contains English Translation).
"Using spine animation in Unity"; https://www.jianshu.com/p/3b81785f90da; Jianshu; Jun. 2017; accessed Nov. 20, 2023; 6 pages.

* cited by examiner

METHOD AND SYSTEM OF AUTOMATIC ANIMATION GENERATION

CROSS-REFERENCE TO RELATED APPLICATIONS

The present application is the National Stage of International Patent Application No. PCT/CN2019/125527, filed Dec. 16, 2019, which claims priority to Chinese patent application number CN 201811569106.8, filed on Dec. 21, 2018, entitled "METHOD AND SYSTEM OF AUTOMATIC ANIMATION GENERATION." The entire content of both applications is incorporated in the present application by reference.

TECHNICAL FIELD

The present invention relates to a method and a system of automatic animation generation, in particular to a method and a system of automatically generating an animation of a Spine tool in a Unity3d tool.

BACKGROUND

Unity3d is a multi-platform comprehensive game development tool developed by Unity Technologies that allows players to easily create interactive contents such as 3D video games, architectural visualization, and real-time 3D animation and is a fully integrated professional game engine.

When using a Unity3d tool for game development, skeletal animation is used for rendering to facilitate the modeling of artists. There are more skeletal animation plug-ins in the Unity3d tool, but a Spine tool is usually used for skeletal animation editing.

Spine is a 2D skeletal animation editing tool for game development and has a good UI design and complete 2D skeletal animation editing functions. And the workflow is more concise and efficient. The Spine tool contains special functions such as skin, free deformation, skinning and so on. The user can control bones and realize animation playing by binding pictures to the bones, and even a running of the animation with complex human body can be simulated to make animation details of a game become more exquisite. Spine allows customizing a polygon within the rectangular boundary, and this optimization method can ignore the pixels outside the polygon automatically, thereby maximizing the space utilization of the final texture atlas. At the same time, Spine also allows users to deform the pictures by moving grid points, which can perform functions that some rectangular pictures cannot achieved, such as stretching, squeezing, bending, bouncing and so on. In addition, "skinning" function added in the new version of Spine allows users to attach specified points in a mesh to specified bones, and then the attached points can move with the bones, and the mesh will automatically deform accordingly. This way allows users to use bone actions to control character's pictures for bending and deformation.

According to the traditional game development process, the artists make a UI (User Interface) animation in the Spine tool, and then reproduce the UI animation in the Unity3d tool according to an art effect in the Spine tool. When the Unity3d tool reproduces the Spine animation, it is necessary to reproduce a key frame animation, but these key frames have been made in Spine before. These repetitive tasks lead to low development efficiency, and sometimes even lead to incomplete animation reproduction effect, affecting the game quality.

SUMMARY

The present invention provides a method and a system of automatic animation generation, which can automatically generate key frames without reproducing Spine key frames in a Unity3d tool, reduce repetitive work, and greatly improve the efficiency of game development.

In order to achieve the above purpose, the present invention provides a method of automatic animation generation, and the method includes: importing Json data exported from a Spine tool into a Unity3d tool, parsing the Json data into an animation data format by the Unity3d tool, obtaining key frame information from the animation data format and saving the key frame information as an animation file of the Unity3d tool, and running the animation file to play an animation.

The importing Json data into a Unity3d tool includes: copying and saving the Json data to a folder in the Unity3d tool.

The parsing the Json data into an animation data format includes: using a class library which can parse the Json data into Object data to parse the Json data exported from the Spine tool into the animation data format with a data structure corresponding to Json data structure one-to-one.

The Json data structure includes:
a file name and a Hash value;
bone information;
slot information;
skin information;
animation information, which includes the key frame information.

The animation data format includes:
the file name and the Hash value, for identifying and verifying;
Spine bone information, for the Unity3d tool to create a hierarchical relationship;
Spine slot information, for processing a color blending mode in the Unity3d tool;
Spine animation information, for the Unity3d tool to create a key frame.

The obtaining key frame information from the animation data format and saving the key frame information as an animation file of the Unity3d tool includes:
saving the key frame information in the Spine animation information of the animation data format into different key frame arrays according to time and value, generating continuous AnimationCurves by all the key frame arrays according to different time series, and saving key frame data and the AnimationCurves as the animation file.

The present invention also provides an automatic animation generation system, which includes a computing terminal, the computing terminal including:
 a memory, storing animation automatic generation instructions and Json data exported from a Spine tool, and storing an animation file generated by a Unity3d tool;
 a processor, running the Spine tool and the Unity3d tool, and executing the animation automatic generation instructions;
 the animation automatic generation instructions including: importing the Json data exported from the Spine tool into the Unity3d tool, parsing the Json data into an animation data format by the Unity3d tool, obtaining key frame information from the animation data format and saving the key frame information as the animation file of the Unity3d tool, and running the animation file to play an animation.

The present invention also provides an automatic animation generation system, which includes a first computing terminal, a second computing terminal and an external mobile storage device;
  the external mobile storage device, storing Json data exported from a Spine tool;
  the first computing terminal including:
  a first processor, running the Spine tool, and exporting the Json data;
  the second computing terminal including:
  a second memory, storing animation automatic generation instructions and an animation file generated by a Unity3d tool;
  a second processor, running the Unity3d tool, and executing the animation automatic generation instructions;
  the animation automatic generation instructions including: importing the Json data exported from the Spine tool into the Unity3d tool, parsing the Json data into an animation data format by the Unity3d tool, obtaining key frame information from the animation data format and saving the key frame information as the animation file of the Unity3d tool, and running the animation file to play an animation.

The present invention also provides an automatic animation generation system, which includes a first computing terminal and a second computing terminal, and the first computing terminal and the second computing terminal communicates with each other through a wireless network or a wired network;
  the first computing terminal including:
  a first memory, storing Json data exported from a Spine tool;
  a first processor, running the Spine tool, and exporting the Json data;
  the second computing terminal including:
  a second memory, storing animation automatic generation instructions and an animation file generated by a Unity3d tool;
  a second processor, running the Unity3d tool, and executing the animation automatic generation instructions;
  the animation automatic generation instructions including: importing the Json data exported from the Spine tool into the Unity3d tool, parsing the Json data into an animation data format by the Unity3d tool, obtaining key frame information from the animation data format and saving the key frame information as the animation file of the Unity3d tool, and running the animation file to play an animation.

The present invention does not need to remake the Spine key frame in the Unity3d tool, and the key frame can be automatically generated, the animation key frame effects of the Spine tool can be reproduced, such as displacement, zooming, rotation, and color change, and the animation made by the artist in the Spine tool can be accurately restored, which reduces repetitive work and greatly improves the efficiency of game development.

DETAILED DESCRIPTION OF ILLUSTRATIVE EMBODIMENTS

Hereinafter, a preferred embodiment of the present invention will be described in detail based on FIGS. 1 to 3.

The present invention provides a method of automatic animation generation, which is suitable for execution in a computing terminal and an animation in a Spine tool can be generated automatically in a Unity3d tool.

Figure 1:
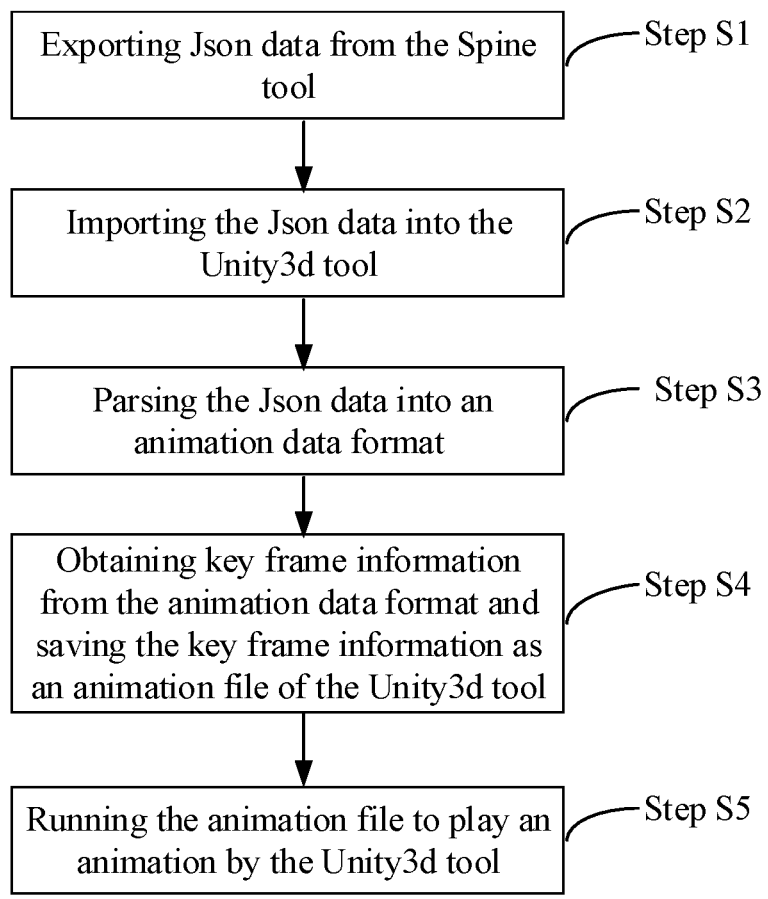
FIG. 1 is a flowchart of a method of automatic animation generation provided by the present invention.
Figure 2:
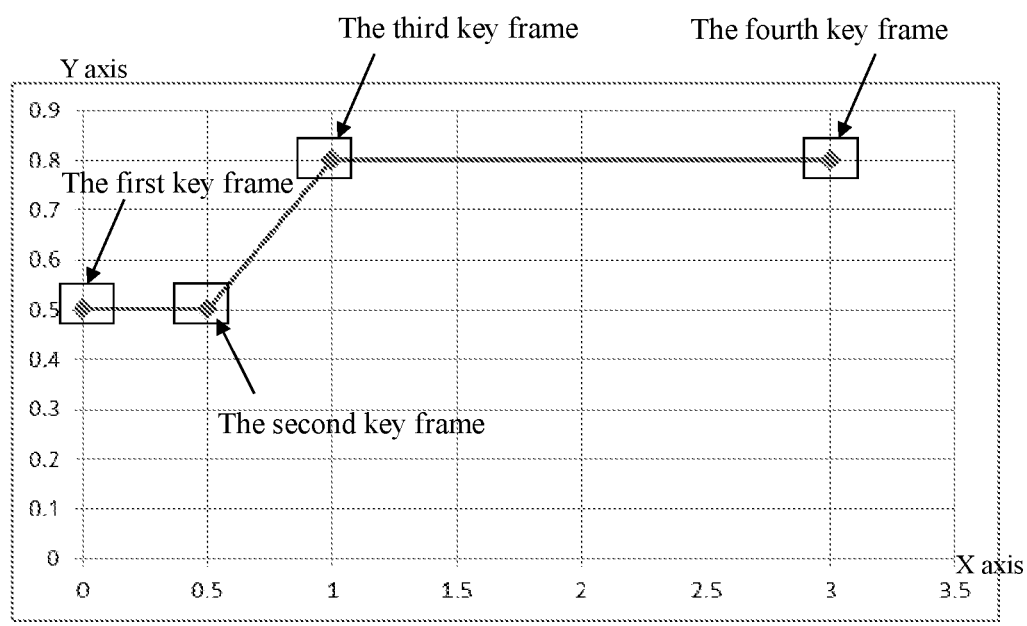
FIG. 2 is a schematic diagram of a key frame.

As shown in FIG. 1, the method of automatic animation generation includes the following steps:
  Step S1, exporting Json data from the Spine tool;
  Step S2, importing the Json data into the Unity3d tool;
  Step S3, parsing the Json data into an animation data format;
  Step S4, obtaining key frame information from the animation data format and saving the key frame information as an animation file of the Unity3d tool;
  Step S5, running the animation file to play an animation by the Unity3d tool.

Before running the Unity3d tool to automatically generate the animation, an artist first creates UI (User Interface) animation in the Spine tool, and the most important thing is to complete the creation of key frames. All parameters that affect the screen image can be the parameters of key frames. The key frame generally contains: displacement, zooming, rotation, color and other information. Interpolation calculations among key frames can produce realistic motion effects. There are usually a plurality of key frames on a curve. As shown in FIG. 2, there are 4 key frames on a moving curve, the first key frame is at the 1st frame, the position is (0,0.5) in a two-dimensional coordinate system, and the second key frame is at the 30th frame, the position is (0.5, 0.5) in the two-dimensional coordinate system, the third key frame is at the 45th frame, the position is (1, 0.8) in the two-dimensional coordinate system, the fourth key frame is at the 100th frame, and the position is (3, 0.8) in the two-dimensional coordinate system.

The Spine tool can export the animation in a project as the JSON data or a binary format file, which can be perfectly reproduced in a Spine runtime library. The Spine tool can also export GIF animations, PNG or JPG sequence diagrams, and AVI or QuickTime video files at the same time.

Principle of creating the key frame in different tools are the same, because the format of the data exported by the Spine tool is the Json data, so the Json data can be used as intermediate data and exchange data to make the animation in the Spine tool automatically reproduced in the Unity3d tool, which can save a lot of time and improve work efficiency. JSON data (JavaScript Object Notation, JS Object Notation) is a lightweight data exchange format, and uses a text format completely independent of the programming language to store and represent data based on a subset of ECMAScript (which is a specification developed by the European Computer Association). The JSON data can convert a set of data represented in a JavaScript object into a string, and then the string can be easily transferred between networks or programs, and restored to a data format supported by each programming language when required. A concise and clear hierarchical structure makes JSON an ideal data exchange language, which is easy for people to read and write, and also easy for machine to parse and generate, and effectively improve network transmission efficiency.

After the Json data is exported from the Spine tool, then the Json data is imported into the Unity3d tool. This step is to put the Json data exported from the Spine tool into the Unity3d engine environment to prepare for the next step of data analysis. The process of importing the Json data into the Unity3d tool is actually copying and saving the Json data to a folder in the Unity3d tool. A saving path of the Json data in the Unity3d tool can be customized. For example, in a preferred embodiment, the Json data can be copied to the Assets/SpineData file under the project directory folder of the Unity3d tool.

The key of the present invention is to parse the Json data exported from the Spine tool to reconstruct a unity animation format in the unity3d tool, which means that the key information is transferred from one platform to another platform, so that animation systems of the unity and the Spine are connected.

When parsing the Json data, a class library is used to parse the Json data exported from the Spine tool into the animation data format with a data structure corresponding to Json data structure one-to-one, wherein the class library can parse the Json data into Object data.

In a preferred embodiment of the present invention, a JsonMapper.ToObject method of a LitJson library can be used to parse the Json data to generate the animation data format. The LitJson library is one of the plug-ins for parsing json and can be used in C# applications, web programs, and Unity3d C# scripts. The features of the LitJson library are small, fast and easy to use. Minijson can also be used to parse the Json data to generate the animation data format. The minijson can simply decode and encode JSON strings, which is mainly convenient for Unity3D to parse JSON internally. Newtonsoft.Json can also be used to parse the Json data to generate the animation data format. The Newtonsoft.Json is an open source world-class Json operation library. The Object data type can point to any data type, and assign any reference type (string, array, class or interface) for an Object variable. The Object variable can also refer to data of any value type (numerical value, Boolean, Char, Date, structure or Enum).

The Json data structure exported from the Spine tool includes:
1、 a file name and a Hash value (the hash algorithm maps any length of a binary value to a fixed-length of smaller binary value, the smaller binary value is called a hash value. The Hash value is a unique and extremely compact numerical representation of a piece of data);
2、 bone information;
3、 slot information (the slot information is an object responsible for blending modes and colors);
4、 skin information (the Skin information is used for character dressing);
5、 animation information.

Corresponding to the Json data structure, an animation data format structure generated by parsing includes:
1、 the file name and the Hash value, for identifying and verifying;
2、 Spine bone information, for the Unity3d tool to create a hierarchical relationship;
3、 Spine slot information, for processing a color blending mode in the Unity3d tool;
4、 Spine animation information, for the Unity3d tool to create the key frame such as displacement, rotation, scaling, color and so on.

The animation data format can be C# data structure. C# is a simple, modern, universal, object-oriented programming language developed by Microsoft. The data structure commonly used includes Array, LinkedList, Stack, Dictionary and so on.

In the animation data format, Spine animation information is contained. The Spine animation information contains the key frame information such as displacement, rotation, scaling, color and so on. The key frame information in the Spine animation information is saved into different key frame arrays according to time and value. Continuous AnimationCurves are generated by all the key frame arrays according to different time series, and key frame arrays and the AnimationCurves are saved as the animation file. The animation file has a format that can be read and run by the Unity3d tool. The animation file contains data of the key frame arrays and AnimationCurves. The key frame arrays contain time fields and numerical fields. The AnimationCurves are actually a row of continuous key frame arrays.

In a preferred embodiment of the present invention, the key frame arrays are read into an API (Application Programming Interface), and the AnimationCurve is generated in the memory. The AnimationCurve is a very useful function in the Unity3d tool, and the function of the AnimationCurve is to edit an arbitrarily changing curve to be used wherever you want, such as curve terrain, curve trajectory and so on. The AnimationCurve is also used for collision box scaling and gravity adjustment when playing model animation.

The animation file of the Unity3d tool is called Animation.Clip in the memory, and called an .anim file when saved to a disk. Animation.Clip is a collection of reusable frames. Animation clip is the smallest animation building block in the Unity3d tool, represents an independent movement (such as "runleft", "jump" or "crawl", and can be processed and combined in various ways to generate vivid and final results. The anim file is an animation file format in the Unity3d tool, which contains AnimationCurves and key frame information, which can cooperate with an Animation system of the Unity3d tool and has an excellent visual interface.

In a preferred embodiment of the present invention, the method of automatic animation generation includes the following steps:
Step S1, exporting the Json data from the Spine tool;
Step S2, copying and saving the Json data to the Assets/SpineData file under the project directory folder in the Unity3d tool;
Step S3, parsing the Json data into the animation data format with the data structure corresponding to the Json data structure one-to-one using the JsonMapper.ToObject method of the LitJson library;
Step S4, reading the key frame array from the animation data format to the API, generating the AnimationCurves in the memory, and saving the key frame array and the AnimationCurves as the animation file in the .anim format;
Step S5, runing the animation file to play the animation by the Unity3d tool.

The Unity3d tool runs on a wide range of platforms, and its cross-platform capability is very strong. The Unity3d tool supports almost all platforms such as PC, Mac (Apple Personal Computer), Linux system, web, iOS, Android and so on, it is easy to transplant, has outstanding 3D graphics performance and is loved by a lot of game developers. On the mobile platform, the Unity3d tool has almost become a standard tool for 3D game development. The operating platform of the Spine tool supports PC, Mac (Apple Personal Computer) and other platforms. In actual operation, the Unity3d tool and the Spine tool can run on the same platform at the same time, or can run on different platforms. If the Unity3d tool and the Spine tool are running on the same mobile terminal or PC, the Json data exported from the Spine tool can be directly saved in a storage device of the mobile terminal or PC. If the Unity3d tool and the Spine tool run on different platforms, the Json data exported from the Spine tool can be saved to a mobile storage device, and then the Json data is imported into the Unity3d tool through the mobile storage device. Or the Json data exported from the Spine tool is saved to the platform where the Spine tool is located, and then the Json data is transmitted to the platform where the Unity3d tool is located through the network (WiFi network, wired network and so on), and saved in the storage device of the platform where the Unity3d tool is located, so that the Json data can be imported into the Unity3d tool later.

Correspondingly, the present invention further provides a system of automatic animation generation, which is used for realize a method of automatic animation generation, thereby automatically generating an animation of a Spine tool in a Unity3d tool.

In an embodiment of the present invention, the Unity3d tool and the Spine tool run on the same platform at the same time, and the system of automatic animation generation includes a computing terminal, which can be a mobile terminal or a PC, and the mobile terminal can be smart mobile devices such as mobile phones and tablet computers, the operating system running on the computing terminal can be Microsoft's windows operating system, Android system, Apple's iOS operating system, Linux system and so on.

Figure 3:
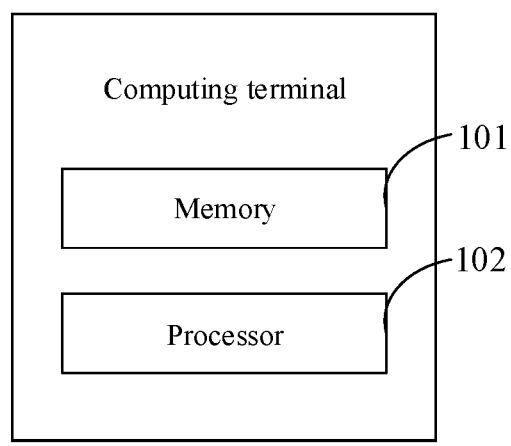
FIG. 3 is a schematic diagram of a computing terminal.

Referring to FIG. 3, the computing terminal includes:
a memory 101, which is for storing animation automatic generation instructions and Json data exported from a Spine tool, and storing an animation file generated by a Unity3d tool;
a processor 102, which is for running the Spine tool and the Unity3d tool, and executing the animation automatic generation instructions;
the animation automatic generation instructions include:
exporting the Json data from the Spine tool;
importing the Json data into the Unity3d tool;
parsing the Json data into an animation data format;
obtaining key frame information from the animation data format and saving the key frame information as the animation file of the Unity3d tool, and
running the animation file to play an animation by the Unity3d tool.

In another embodiment of the present invention, the Unity3d tool and the Spine tool run on different platforms, and the system of automatic animation generation includes a first computing terminal, a second computing terminal and an external mobile storage device. The first computing terminal and the second computing terminal can be the mobile terminal or the PC, and the mobile terminal can be a smart mobile device such as a mobile phone and a tablet computer, the operating system running on the computing terminal can be Microsoft's windows operating system, Android system, Apple's iOS operating system, Linux system and so on.

The external mobile storage device is for storing Json data exported from a Spine tool;
The first computing terminal includes:
a first processor, which is for running the Spine tool, and exporting the Json data;
The second computing terminal includes:
a second memory, which is for storing animation automatic generation instructions and an animation file generated by a Unity3d tool;
a second processor, which is for running the Unity3d tool, and executing the animation automatic generation instructions;
The animation automatic generation instructions include:
exporting the Json data from the Spine tool;
importing the Json data into the Unity3d tool;
parsing the Json data into an animation data format;
obtaining key frame information from the animation data format and saving the key frame information as the animation file of the Unity3d tool, and
running the animation file to play an animation by the Unity3d tool.

In another embodiment of the present invention, the Unity3d tool and the Spine tool run on different platforms, and the platforms communicate with each other. The system of automatic animation generation includes a first computing terminal and a second computing terminal, and the first computing terminal and the second computing terminal communicates with each other through a wireless network or a limited network. The first computing terminal and the second computing terminal can be the mobile terminal or the PC, and the mobile terminal can be the smart mobile device such as the mobile phone and the tablet computer, the operating system running on the computing terminal can be Microsoft's windows operating system, Android system, Apple's iOS operating system, Linux system and so on.

The first computing terminal includes:
a first memory, which is for storing Json data exported from a Spine tool;
a first processor, which is for running the Spine tool, and exporting the Json data;
The second computing terminal includes:
a second memory, which is for storing animation automatic generation instructions and an animation file generated by a Unity3d tool;
a second processor, which is for running the Unity3d tool, and executing the animation automatic generation instructions;
The animation automatic generation instructions include:
exporting Json data from the Spine tool;
importing the Json data into the Unity3d tool;
parsing the Json data into an animation data format;
obtaining key frame information from the animation data format and saving the key frame information as the animation file of the Unity3d tool; and
running the animation file to play an animation the Unity3d tool.

The present invention does not need to re-create the Spine key frame in the Unity3d tool, and can automatically generate the key frame, reproduce the animation key frame effects of the Spine tool such as displacement, zooming, rotation, and color change, and accurately restore the animation made by the artist in the Spine tool, reducing repetitive work and greatly improving the efficiency of game development.

Although the contents of the present invention has been described in detail through the above preferred embodiments, it should be recognized that the above description should not be considered as limiting the present invention. After those skilled in the art have read the above content, various modifications and substitutions to the present invention will be obvious. Therefore, the protection scope of the present invention should be defined by the appended claims.

What is claimed is:

1. A method of automatically generating three-dimensional animations, the method comprising:
    exporting data in a first format containing two-dimensional animation information comprising frame information from a two-dimensional animation tool;
    importing the data into a three-dimensional game development tool;
    parsing the data into an animation data format by the three-dimensional game development tool, wherein the animation data format is a three-dimensional format, wherein the parsing the data into an animation data format further comprises parsing the data into the animation data format using a class library, wherein the class library is configured to parse the data in the first format, and wherein the animation data format comprises a data structure corresponding to a structure of the data in the first format;
obtaining key frame information based on the animation data format;
storing the key frame information as an animation file for the three-dimensional game development tool; and
playing an animation by running the animation file by the three-dimensional game development tool.

2. The method of claim 1, wherein the importing the data into a three-dimensional game development tool further comprises copying and storing the data to a folder in the three-dimensional game development tool.

3. The method of claim 1, wherein the animation data format comprises a file name, a Hash value, bone information, slot information, and animation information.

4. The method of claim 3, wherein the obtaining key frame information based on the animation data format further comprises:
converting the animation information into a plurality of key frame arrays based on time sequence; and
generating a continuous animation curve based on the plurality of key frame arrays according to the time sequence.

5. The method of claim 3, further comprising:
generating a hierarchical relationship based on the bone information by the three-dimensional game development tool;
processing a color blending mode based on the slot information by the three-dimensional game development tool; and
generating key frames based on the animation information by the three-dimensional game development tool.

6. The method of claim 4, further comprising:
storing the plurality of key frame arrays and data indicative of the continuous animation curve as the animation file.

7. A system of automatically generating three-dimensional animations, comprising:
at least one processor; and
at least one memory communicatively coupled to the at least one processor and storing instructions that upon execution by the at least one processor cause the system to perform operations comprising:
exporting data in a first format containing two-dimensional animation information comprising frame information from a two-dimensional animation tool;
importing the data into a three-dimensional game development tool;
parsing the data into an animation data format by the three-dimensional game development tool wherein the animation data format is a three-dimensional format, wherein the parsing the data into an animation data format further comprises parsing the data into the animation data format using a class library, wherein the class library is configured to parse the data in the first format, and wherein the animation data format comprises a data structure corresponding to a structure of the data in the first format;
obtaining key frame information based on the animation data format;
storing the key frame information as an animation file for the three-dimensional game development tool; and
playing an animation by running the animation file by the three-dimensional game development tool.

8. The system of claim 7, wherein the importing the data into a three-dimensional game development tool further comprises copying and storing the data to a folder in the three-dimensional game development tool.

9. The system of claim 7, wherein the animation data format comprises a file name, a Hash value, bone information, slot information, and animation information.

10. The system of claim 9, the operations further comprising:
generating a hierarchical relationship based on the bone information by the three-dimensional game development tool;
processing a color blending mode based on the slot information by the three-dimensional game development tool; and
generating key frames based on the animation information by the three-dimensional game development tool.

11. The system of claim 9, the operations further comprising:
converting the animation information into a plurality of key frame arrays based on time sequence; and
generating a continuous animation curve based on the plurality of key frame arrays according to the time sequence.

12. The system of claim 11, the operations further comprising:
storing the plurality of key frame arrays and data indicative of the continuous animation curve as the animation file.

13. A non-transitory computer-readable storage medium, storing computer-readable instructions that upon execution by at least one processor cause the at least one processor to implement operations comprising:
exporting data in a first format containing two-dimensional animation information comprising frame information from a two-dimensional animation tool;
importing the data into a three-dimensional game development tool;
parsing the data into an animation data format by the three-dimensional game development tool wherein the animation data format is a three-dimensional format, wherein the parsing the data into an animation data format further comprises parsing the data into the animation data format using a class library, wherein the class library is configured to parse the data in the first format, and wherein the animation data format comprises a data structure corresponding to a structure of the data in the first format;
obtaining key frame information based on the animation data format;
storing the key frame information as an animation file for the three-dimensional game development tool; and
playing an animation by running the animation file by the three-dimensional game development tool.

14. The non-transitory computer-readable storage medium of claim 13, wherein the animation data format comprises a file name, a Hash value, bone information, slot information, and animation information.

15. The non-transitory computer-readable storage medium of claim 14, the operations further comprising:
generating a hierarchical relationship based on the bone information by the three-dimensional game development tool;

processing a color blending mode based on the slot information by the three-dimensional game development tool; and generating key frames based on the animation information by the three-dimensional game development tool.

16. The non-transitory computer-readable storage medium of claim 14, the operations further comprising:

converting the animation information into a plurality of key frame arrays based on time sequence; and generating a continuous animation curve based on the plurality of key frame arrays according to the time sequence.

17. The non-transitory computer-readable storage medium of claim 16, the operations further comprising:

storing the plurality of key frame arrays and data indicative of the continuous animation curve as the animation file.

* * * * *